(12) United States Patent
Chen et al.

(10) Patent No.: US 6,326,915 B1
(45) Date of Patent: Dec. 4, 2001

(54) RADAR DEVICE WITH MULTIPLEXED DISPLAY FUNCTIONS FOR USE IN BACKING UP A VEHICLE

(75) Inventors: Shin-Chung Chen; Sen-Jung Chen, both of Taoyuan Hsien (TW)

(73) Assignee: Tung Thih Enterprise Co., Ltd. (TW)

( * ) Notice: Subject to any disclaimer, the term of this patent is extended or adjusted under 35 U.S.C. 154(b) by 0 days.

(21) Appl. No.: 09/491,339

(22) Filed: Jan. 26, 2000

(51) Int. Cl.[7] ............................. G01S 13/93; G01S 13/86; G01S 15/93
(52) U.S. Cl. ................................. 342/71; 342/27; 342/52; 342/55; 342/59; 342/61; 342/70; 342/118; 342/134; 342/139; 342/142; 342/146; 342/147; 342/195; 367/87; 367/95; 367/99; 367/107; 367/113; 367/116
(58) Field of Search .................................. 342/52, 55, 61, 342/70–72, 118, 175, 176, 179, 195, 127, 134, 139, 142, 145–147, 59, 27, 28; 180/167–169; 367/87, 93, 95, 99, 100, 107, 108, 113, 116

(56) References Cited

U.S. PATENT DOCUMENTS 5,314,037 * 5/1994 Shaw et al. .......................... 180/169
5,479,173 * 12/1995 Yoshioka et al. ...................... 342/70

* cited by examiner

Primary Examiner—Bernarr E. Gregory
(74) Attorney, Agent, or Firm—Jackson Walker L.L.P.

(57) ABSTRACT

A radar device for use in backing up a vehicle is disclosed herein. A plurality of wave sensors is installed on a rear portion of a vehicle for detecting an obstacle therebehind. A master controller has a plurality of transceiver circuits and a microprocessor connected to the plurality of transceiver circuits. Each transceiver circuit corresponds to one of the plurality of wave sensors. The microprocessor activates the plurality of transceiver circuits to drive the plurality of wave sensors for transmitting and receiving ultrasound wave signals thereby determining the location of the obstacle. A location display device is connected to the master controller for receiving and decoding data related to the location of the obstacle thereby indicating the direction of the obstacle and displaying in numerical form the distance between the obstacle and the vehicle.

4 Claims, 8 Drawing Sheets

RADAR DEVICE WITH MULTIPLEXED DISPLAY FUNCTIONS FOR USE IN BACKING UP A VEHICLE

BACKGROUND OF THE INVENTION

1. Field of the Invention

The present invention relates to a radar device for a vehicle and, more particularly, to a radar device having a camera and multiple wave sensors for use in backing up a vehicle to display the image of an obstacle behind and detect the distance between the obstacle and the vehicle, thereby achieving safety assistance in backing up the vehicle.

2. Description of Related Art

With ever-increasing quantities of vehicles in the world, it is becoming more and more difficult to park a vehicle. Generally, a parking space is not easy to find, and even if there is one, it is usually too small to conveniently park a vehicle. As a result, a driver must be very careful in parking a vehicle to avoid a collision. Therefore, in order to assist a driver in parking a vehicle, there is provided a known radar device for use in backing up the vehicle. Such a radar device utilizes ultrasound waves to detect an obstacle behind the vehicle and, when the rear portion of the vehicle approaches too closely to an obstacle, it generates a warning buzz to notify the driver of such, so as to avoid a possible collision.

The use of this known radar device to assist a driver in driving a vehicle is not satisfactory because there is only a buzz generated when the vehicle is very close to an obstacle. From such a buzz, the driver can not be aware of the direction of the obstacle and the actual distance between the vehicle and the obstacle.

Furthermore, some large vehicles, such as touring buses, are provided with cameras on the rear portions thereof to enable observation of areas behind the vehicles and thus display the images to, and so assist, the drivers. The use of cameras seems helpful to a driver in backing up and parking a vehicle because the driver can actually see the circumstance behind the vehicle. However, in practical application, it is found that, generally, a camera can only take an image with a 110 degree field of view, such that there are some blind spots that can not be caught by the camera and thus the driver will not be aware of an obstacle in the blind spot area.

Accordingly, the use of the conventional radar device and camera for backing up a vehicle is not satisfactory, and thus, there is a need to have a novel device that can mitigate and/or obviate the aforementioned problems.

SUMMARY OF THE INVENTION

The object of the present invention is to provide a radar device with a multiplexed display function for use in backing up a vehicle to achieve safety assistance by displaying an image of an obstacle behind the vehicle and further detecting and displaying the direction of the obstacle and the distance between the obstacle and the vehicle.

To achieve the above object, the radar device in accordance with the present invention has a camera installed in a rear portion of the vehicle, and at least two wave sensors adjacent to the camera for detecting an obstacle behind the vehicle. An image processing module is connected to the camera for processing image signals therefrom. A display monitor is connected to an output of the image processing module for displaying the image captured by the camera. The display monitor is driven by the image processing module to display the direction of the obstacle relative to the vehicle and the distance between the obstacle and the vehicle. A master controller is connected to the at least two wave sensors for determining a communication code representing the distance between the obstacle and the vehicle. The communication code is sent to the image processing module for displaying corresponding direction patterns and distance values on the display monitor with the captured image.

Other objects, advantages, and novel features of the invention will become more apparent from the following detailed description when taken in conjunction with the accompanying drawings.

BRIEF DESCRIPTION OF THE DRAWINGS

FIGS. 7(1) and 7(2) make up a control flowchart of the radar device in accordance with the present invention.

DETAILED DESCRIPTION OF THE PREFERRED EMBODIMENT

Figure 1:
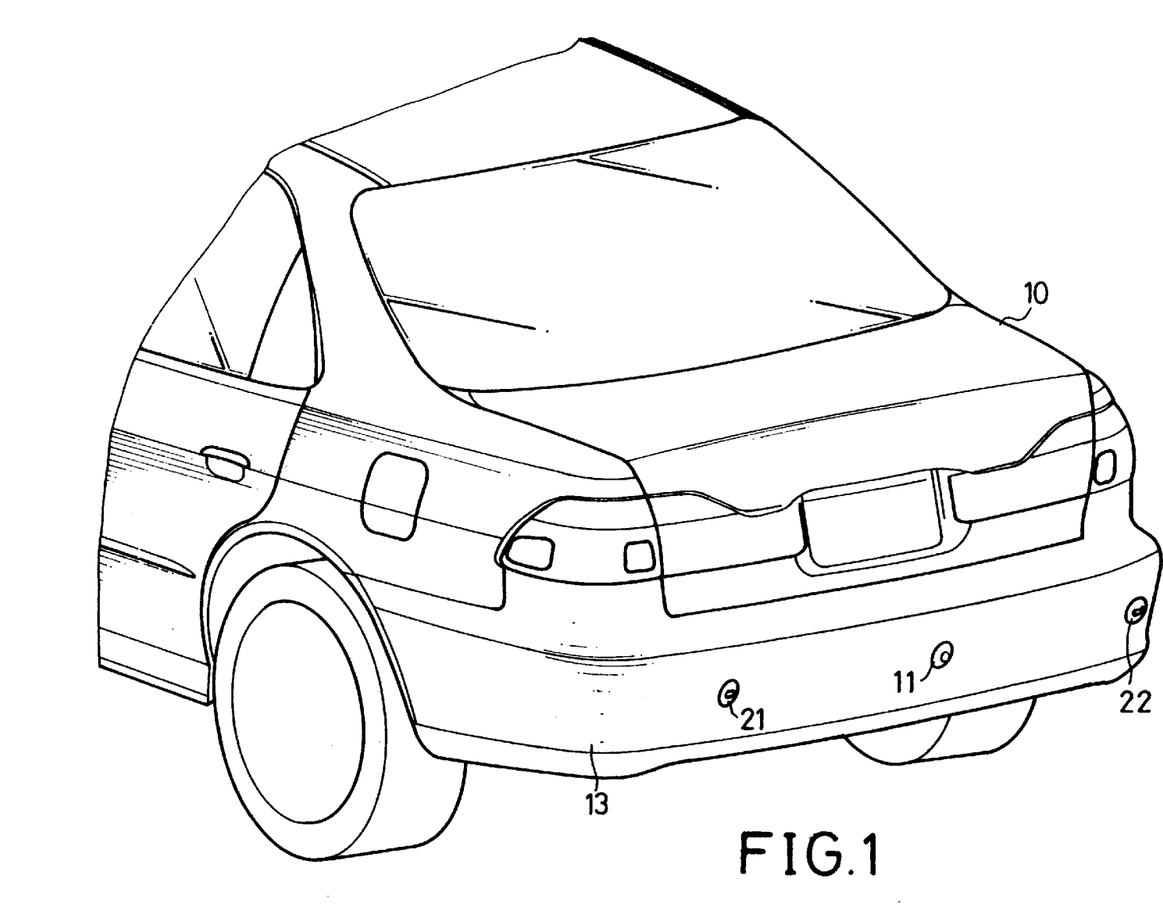
FIG. 1 schematically illustrates use of a radar device in accordance with the present invention.

FIG. 1 shows an arrangement of a radar device with multiplexed display functions in accordance with the present invention, for use in backing up a vehicle. The radar device includes a camera (11) and at least two wave sensors (21,22) installed in a rear portion of the vehicle. In this preferred embodiment, the camera (11) is positioned in a center portion of a bumper (13) of the vehicle, and the two wave sensors (21,22) are positioned close to two ends of the bumper (13), respectively.

The camera (11) is preferred to be a CCD-type pinhole camera which is connected to an image processing module (10) which is described hereinafter, such that an image taken by the camera (11) can be transferred to the image processing module (10) for being processed. The two wave sensors (21,22) are connected to a master controller (40) which is described hereinafter.

Figure 2:
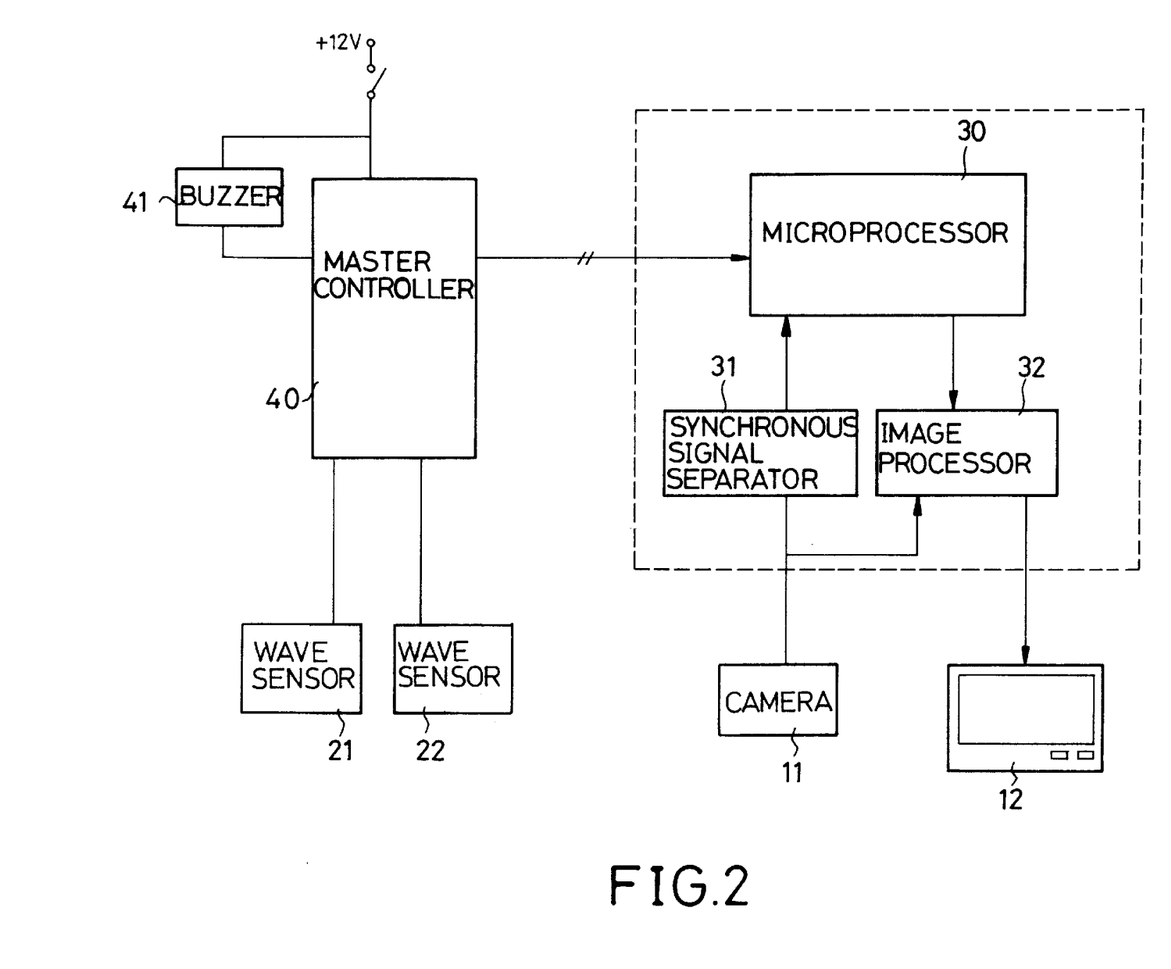
FIG. 2 is a block diagram of the radar device in accordance with the present invention.

FIG. 2 shows the structure of the image processing module (10) and the master controller (40). The image processing module (10) includes a microprocessor (30), a synchronous signal separator (31), and an image processor (32). An input of the microprocessor (30) is connected to the master controller (40) such that the microprocessor (30) is able to receive communication codes from the master controller (40).

The synchronous signal separator (31) has an input connected to the camera (11) to separate an image signal from the camera (11) into a vertical signal and a horizontal signal for being applied to the microprocessor (30).

Figure 3:
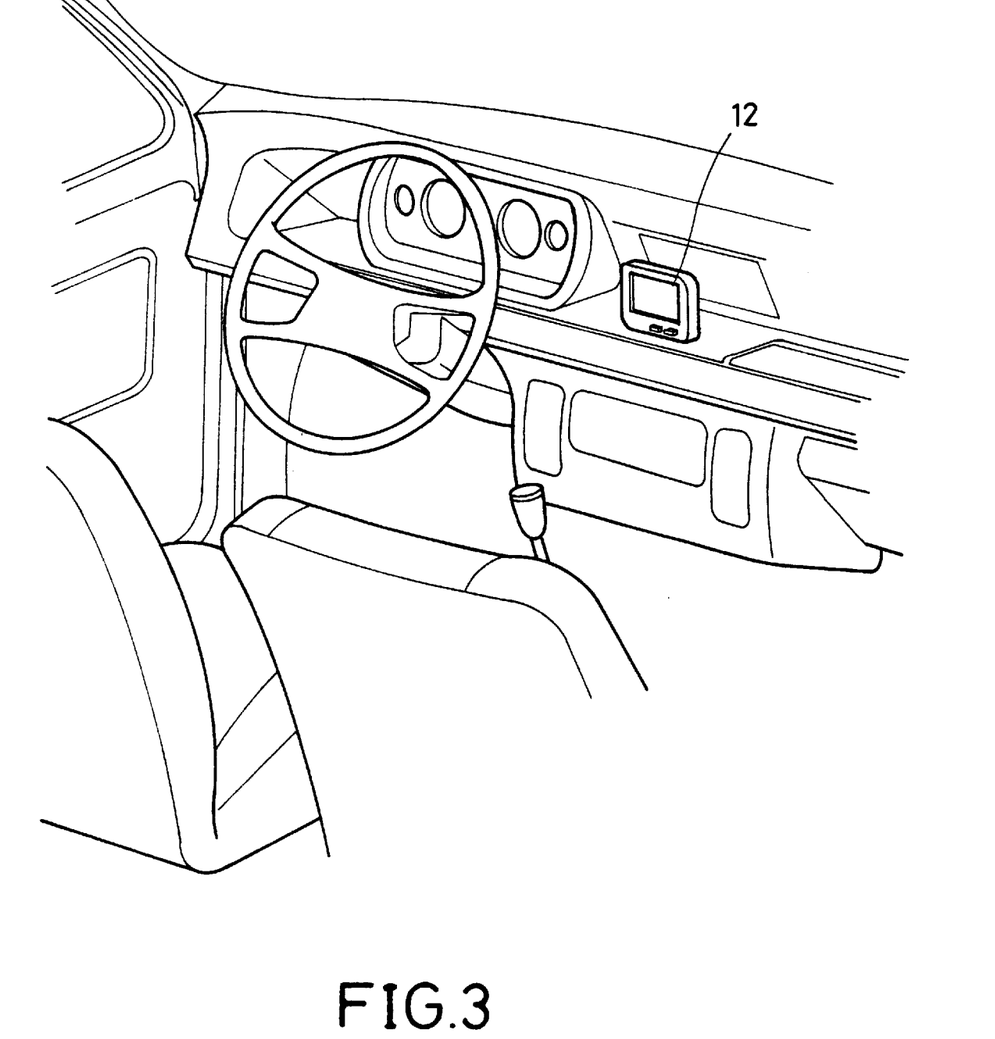
FIG. 3 schematically illustrates the use of a display monitor of the radar device in accordance with the present invention.

The image processor (32) has two inputs for connecting to the camera (11) and microprocessor (30), respectively, and the output thereof is connected to a display monitor (12). As shown in FIG. 3, the display monitor (12) is arranged at a position in front of the driver's seat of the vehicle for being conveniently viewed by the driver.

Figure 4:
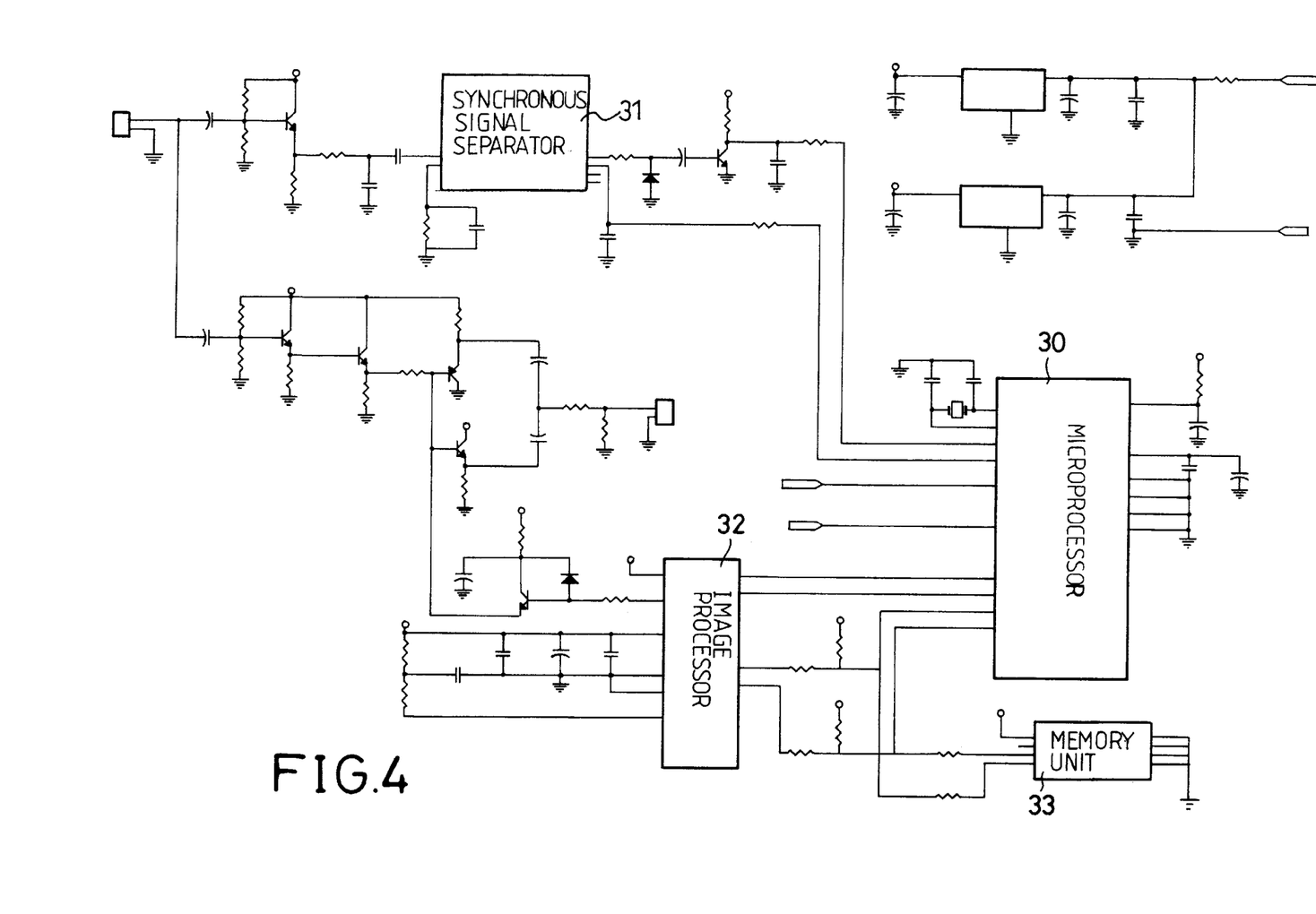
FIG. 4 is a circuit diagram of the radar device in accordance with the present invention.

Furthermore, with reference to FIG. 4, the microprocessor (30) can be connected to a memory unit (33) that is stored with direction patterns and distance values for corresponding to various communication codes.

Figure 5:
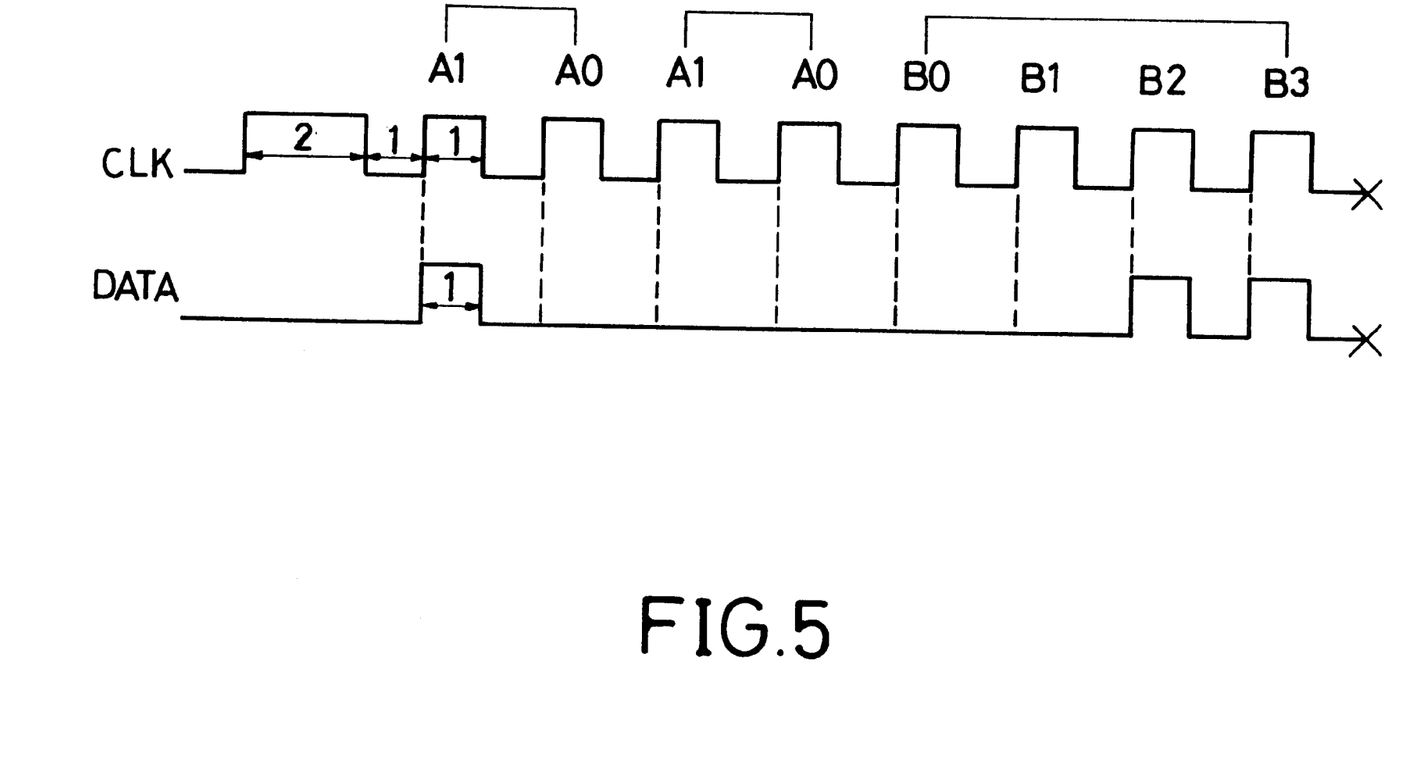
FIG. 5 is a working timing diagram of the radar device in accordance with the present invention.

With reference to FIG. 2 again, the master controller (40) is composed of encoding circuitry to encode the signals from the two wave sensors (21,22). Briefly, an encoding process generates communication codes representing distances between an obstacle and the vehicle determined by the time difference between the two wave sensors (21,22) transmitting signals and receiving reflected signals. The communication codes are then transmitted to the microprocessor (30) of the image processing module (10). The master controller (40) and the microprocessor (30) are connected via a clock signal line (CLK) and a data signal line (DATA). A working timing diagram of the clock signal line (CLK) and a data signal line (DATA) are shown in FIG. 5. In this preferred embodiment, an 8-bit data is transferred via the data signal line (DATA) for every cycle, and a synchronous signal of 2 milliseconds is asserted before data transfer. A first two bits of the 8-bit signal are provided as a left direction detection result which indicates whether an obstacle exists in a left portion behind the vehicle. Similarly, a subsequent two bits are provided as a right portion detection result. The last four bits of the 8-bit signal are provided as a relative distance after being calculated. The relation of these four bits and the actual distance is depicted in Table 1. The usage of the first two or second two bits is given in Table 2.

TABLE 1

| B0 | B1 | B2 | B3 | Actual Distance |
|---|---|---|---|---|
| 1 | 1 | 1 | 1 | 25 |
| 0 | 1 | 1 | 1 | 30 |
| 1 | 0 | 1 | 1 | 35 |
| 0 | 0 | 1 | 1 | 40 |
| 1 | 1 | 0 | 1 | 50 |
| 0 | 1 | 0 | 1 | 55 |
| 1 | 0 | 0 | 1 | 60 |
| 1 | 1 | 1 | 0 | 65 |
| 0 | 1 | 1 | 0 | 70 |
| 1 | 0 | 1 | 0 | 75 |
| 0 | 0 | 1 | 0 | 85 |
| 0 | 1 | 0 | 0 | 90 |
| 1 | 0 | 0 | 0 | 95 |
| 0 | 0 | 0 | 0 | No Signal |

TABLE 2

| A0 | A1 | Display Function |
|---|---|---|
| 0 | 0 | Direction display is off |
| 0 | 1 | Flash at 4Hz |
| 1 | 0 | Flash at 8Hz |
| 1 | 1 | Keeps On, distance display flashes at 2Hz |

Moreover, the master controller (40) has an output connected to a buzzer (41) to provide a warning effect. Such a master controller (40) is known to those skilled in the art and thus further explanation is deemed not necessary.

FIG. 4 is a circuit diagram of the image processing module (10). It is illustrated that, preferably, the microprocessor (30) is a D16F78 processor chip. The synchronous signal separator (31) is an LM1881 integrated circuit chip. The image processor (32) is a D1642003 integrated circuit chip. The memory unit (33) is a 24LC028 memory chip. These electronic elements are provided for illustrative purpose only without limiting the scope of the present invention.

In use of the radar device in accordance with the present invention, when a vehicle starts to reverse for parking, typically, the wave sensors (21,22) will not receive any reflected signals because any obstacle will still be far away from the vehicle. At this moment, the driver can look at the display monitor (12) in front of the driver's seat to be aware of the circumstance behind the vehicle. When the vehicle starts getting closer to an obstacle and the camera (11) may not be able to catch its image of the obstacle due to its limited field of view, the ultrasound wave signals transmitted by the two wave sensors (21,22) will be reflected by the obstacle, and the reflected signals are received by the two wave sensors (21,22), thereby activating the buzzer (41) to generate a warning buzz.

FIGS. 7(1) and 7(2) make up a flowchart illustrating the use of the wave sensors (21,22) to detect an obstacle and generate a buzz for warning. The flowchart begins from the first wave sensor (21) transmitting an ultrasound wave signal and detecting whether a reflected signal is received. If negative, the data in memory is cleared, and the second wave sensor (22) is driven to transmitting an ultrasound wave signal. If received, it indicates that there is an obstacle detected in the corresponding direction, and the actual distance between the obstacle and the vehicle is determined by the master controller (40) and thus stored in a memory. Simultaneous to the first wave sensor (21) operation, the second wave sensor (22) is operating in the same manner as the first wave sensor (21) to transmit and receive ultrasound wave signals. After the two wave sensors (21,22) have been applied to detect an obstacle, the data in the memory is encoded by the master controller (40) and transmitted to the microprocessor (30) of the image processing module (10). Simultaneously, the master controller (40) will activate the buzzer (41) to generate buzzes at different frequencies when the vehicle gradually approaches the obstacle, thereby notifying the driver of such.

Furthermore, the master controller (40) carries out the encoding process based on the time difference between the wave sensors (21,22) transmitting signals and receiving the reflected signals. Therefore, reduction of the time difference indicates that the distance between the vehicle and the obstacle is getting shorter. Such a message representing the change of distance is transformed to a communication code that is sent to the microprocessor (30) of the image processing module (10) for being decoded. The microprocessor (30) then picks up, from the memory unit (33), a direction pattern and a distance value corresponding to the communication code. The direction pattern and the distance value are sent to the image processing module (10) for being processed and then displayed on the display monitor (12). Accordingly, the driver can be aware of the direction and distance of the obstacle behind the vehicle by looking at the screen of the display monitor (12).

Figure 6:
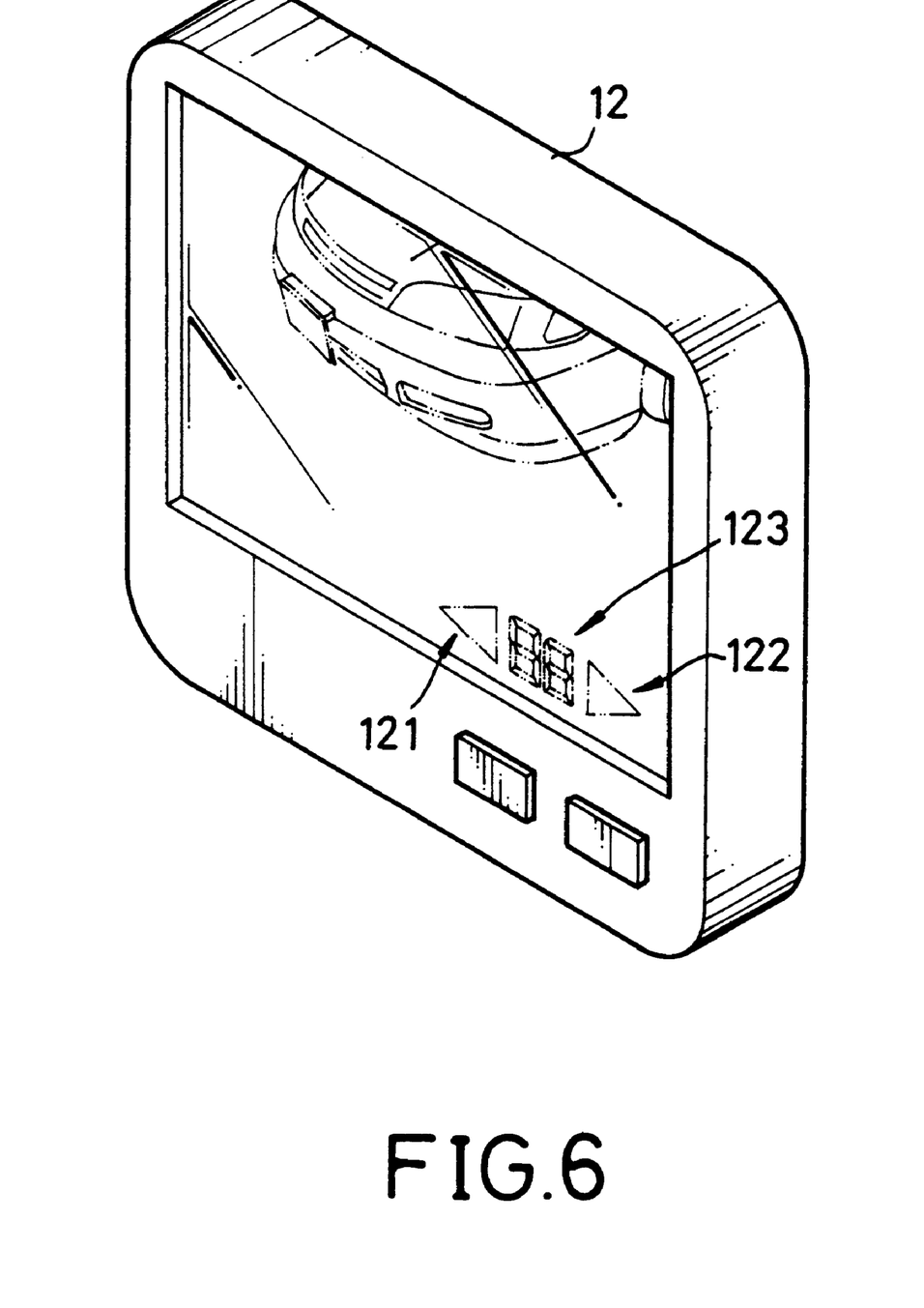
FIG. 6 shows a screen of the display monitor of the radar device in accordance with the present invention.
Figure 7:
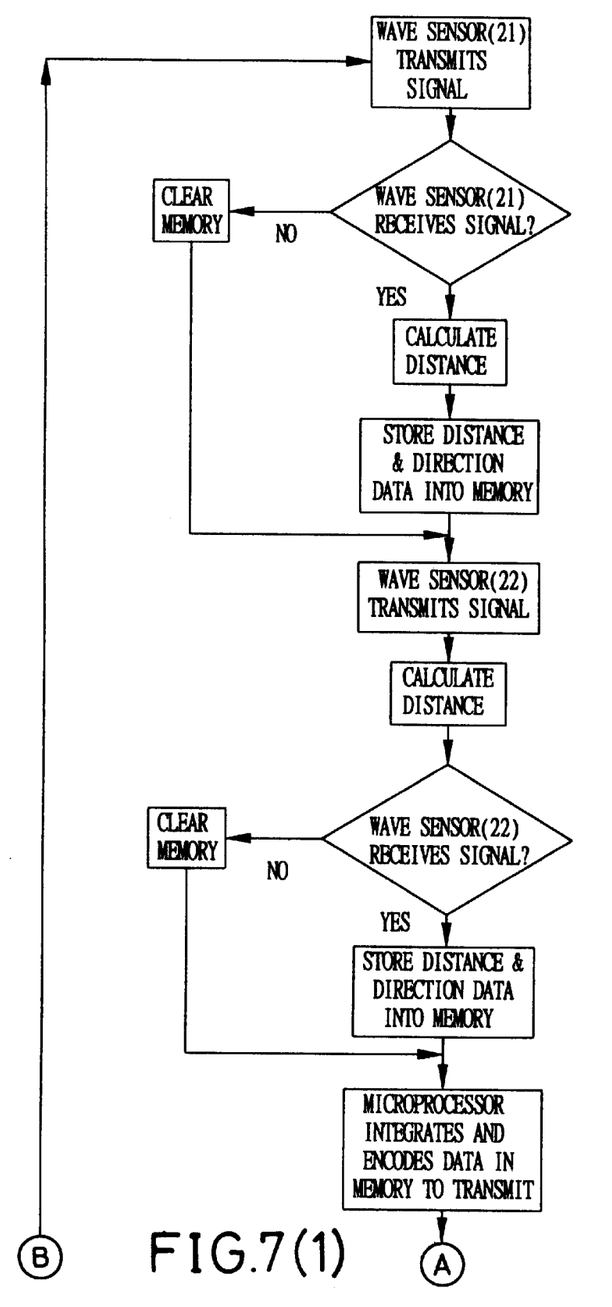

With reference to FIG. 6, it is illustrated how the distance and direction of the obstacle relative to the vehicle are displayed. The screen of the display monitor (12) exhibits the image of the circumstance behind the vehicle captured by the camera (11). In the bottom right corner of the screen, there is shown a left arrow (121), a right arrow (122) and a numerical pattern (123) in between the left and right arrows (121,122). The two arrows (121,122) represent the two wave sensors (21,22) in operation, respectively. For example, when the left arrow (121) is displayed or blinked, and the numerical pattern (123) also exhibits a value of 50 at the same time, it indicates that there is an obstacle in the left direction behind the vehicle and the distance therebetween is 50 centimeters. Similarly, when the right arrow (122) is blinked, and the numerical pattern (123) simultaneously exhibits a value of 40, it indicates that there is an obstacle in the right direction behind the vehicle and the distance therebetween is 40 centimeters. Consequently, the actual circumstance behind the vehicle can be clearly displayed on the screen of the display monitor (12) such that the driver shall be able to easily park the vehicle.

Although the present invention has been explained in relation to its preferred embodiment, it is to be understood that many other possible modifications and variations can be made without departing from the spirit and scope of the invention as hereinafter claimed.

What is claimed is:

1. A radar device with multiplexed display functions for use in backing up a vehicle, comprising:

a camera (11) adapted to be installed in a rear portion of the vehicle; at least two wave sensors (21,22) adapted to be installed in the rear portion of the vehicle and adjacent to the camera (11) for detecting an obstacle behind the vehicle;

an image processing module (10) connected to the camera (11) for processing image signals from the camera (11);

a display monitor (12) connected to an output of the image processing module (10) for displaying an image captured by the camera (11), and driven by the image processing module (10) to display a direction of the obstacle relative to the vehicle and the distance between the obstacle and the vehicle; and a master controller (40) connected to the at least two wave sensors (21,22) for determining a communication code representing the distance between the obstacle and the vehicle, wherein the communication code is sent to the image processing module (10) for displaying a corresponding direction pattern and a distance value on the display monitor (12) with the captured image.

2. The radar device as claimed in claim 1, wherein the image processing module (10) comprising:

a microprocessor (30) having an input for connecting to the master controller (40);

a synchronous signal separator (31) having an input for connecting to the camera (11) to separate the image signal from the camera (11) into a vertical signal and a horizontal signal for being applied to the microprocessor (30); and an image processor (32) having two inputs for connecting to the camera (11) and the microprocessor (30), respectively, and an output connected to the display monitor (12).

3. The radar device as claimed in claim 2, wherein the microprocessor (30) is further connected to a memory unit (33) that is stored with multiple direction patterns and distance values corresponding to various communication codes, respectively.

4. The radar device as claimed in claim 1, wherein the master controller (40) has an output for connecting to a buzzer.

* * * * *